United States Patent
Martin et al.

(10) Patent No.: US 8,683,554 B2
(45) Date of Patent: Mar. 25, 2014

(54) SYSTEM AND METHOD FOR MANAGING THIRD PARTY APPLICATION PROGRAM ACCESS TO USER INFORMATION VIA A NATIVE APPLICATION PROGRAM INTERFACE (API)

(75) Inventors: Brian Martin, Moraga, CA (US); Joseph Augst, Alameda, CA (US); Jesse Myers, San Francisco, CA (US); Todd Hodes, Emeryville, CA (US); Scott Hotes, Berkeley, CA (US)

(73) Assignee: WaveMarket, Inc., Emeryville, CA (US)

( * ) Notice: Subject to any disclaimer, the term of this patent is extended or adjusted under 35 U.S.C. 154(b) by 622 days.

(21) Appl. No.: 12/689,769

(22) Filed: Jan. 19, 2010

(65) Prior Publication Data

US 2010/0251340 A1    Sep. 30, 2010

Related U.S. Application Data

(60) Provisional application No. 61/164,361, filed on Mar. 27, 2009.

(51) Int. Cl.
*G06F 21/00* (2013.01)

(52) U.S. Cl.
USPC .................................. 726/4; 726/30; 717/168

(58) Field of Classification Search
USPC .................................. 726/25, 4, 30; 717/106
See application file for complete search history.

(56) References Cited

U.S. PATENT DOCUMENTS

| | | | |
|---|---|---|---|
| 6,138,003 A | 10/2000 | Kingdon et al. | |
| 6,442,752 B1 * | 8/2002 | Jennings et al. | 717/162 |
| 6,594,483 B2 | 7/2003 | Nykanen et al. | |
| 6,961,855 B1 | 11/2005 | Rich et al. | |
| 6,963,748 B2 | 11/2005 | Chithambaram et al. | |
| 7,054,648 B2 | 5/2006 | Abtin et al. | |
| 7,096,029 B1 | 8/2006 | Parupudi et al. | |
| 7,145,898 B1 * | 12/2006 | Elliott | 370/352 |
| 7,190,960 B2 | 3/2007 | Wilson et al. | |
| 7,210,121 B2 * | 4/2007 | Xia et al. | 717/106 |

(Continued)

OTHER PUBLICATIONS

Tobias Vejda et al, Towards Trust Services for Language-Based Virtual Machines for Grid Computing, 2008, Institute for applied Information Processing and Communicatios (IAIK), Graz University of Technology, LNCS 4966, pp. 48-59.*

(Continued)

*Primary Examiner* — Carl Colin
*Assistant Examiner* — Ali Shayanfar
(74) *Attorney, Agent, or Firm* — Dovas Law, P.C.

(57) ABSTRACT

A method for managing third party application program access to user information via a particular native application program interface (API) is provided. The method includes providing a wrapped native API including a wrapper library and inspecting a third party application program for the presence of the wrapper library in an unmodified form. The application program is inspected to identify API calls. An identified API call to a circumventing API is instrumented by wrapping the circumventing API to generate a wrapped non-circumventing API and modifying the third party application program to redirect the identified API call from the circumventing API to the wrapped non-circumventing API. A request for a permission to access user information is received from the third party application program via the wrapper library executed on a user device. An authorization is received to provide the permission to access the user information, and the permission to access the user information is provided to the executed third party application program.

25 Claims, 4 Drawing Sheets

(56) References Cited

U.S. PATENT DOCUMENTS

| | | | |
|---|---|---|---|
| 7,213,048 B1 | 5/2007 | Parupudi et al. | |
| 7,221,947 B2 | 5/2007 | Casey | |
| 7,224,987 B1 | 5/2007 | Bhela | |
| 7,333,820 B2 | 2/2008 | Sheha et al. | |
| 7,461,385 B2 * | 12/2008 | Winter | 719/328 |
| 7,536,437 B2 | 5/2009 | Zmolek | |
| 7,784,087 B2 | 8/2010 | Yami et al. | |
| 7,992,195 B2 | 8/2011 | Pfitzmann et al. | |
| 2002/0016173 A1 | 2/2002 | Hunzinger | |
| 2002/0035556 A1 | 3/2002 | Shah et al. | |
| 2002/0177449 A1 | 11/2002 | McDonnell et al. | |
| 2003/0035544 A1 | 2/2003 | Herle et al. | |
| 2003/0060214 A1 | 3/2003 | Hendrey et al. | |
| 2003/0110076 A1 | 6/2003 | Holt | |
| 2004/0025022 A1 | 2/2004 | Yach et al. | |
| 2004/0143457 A1 | 7/2004 | Demirian et al. | |
| 2004/0198374 A1 | 10/2004 | Bajikar | |
| 2004/0266457 A1 | 12/2004 | Dupray | |
| 2005/0010780 A1 | 1/2005 | Kane et al. | |
| 2005/0048948 A1 | 3/2005 | Holland et al. | |
| 2005/0282557 A1 | 12/2005 | Mikko | |
| 2006/0135177 A1 | 6/2006 | Winterbottom et al. | |
| 2006/0137007 A1 | 6/2006 | Paatero et al. | |
| 2006/0167816 A1 | 7/2006 | Wang et al. | |
| 2006/0189328 A1 | 8/2006 | Cedervall et al. | |
| 2007/0060171 A1 | 3/2007 | Sudit et al. | |
| 2007/0105565 A1 | 5/2007 | Enzmann et al. | |
| 2007/0136202 A1 | 6/2007 | Noma et al. | |
| 2007/0287473 A1 | 12/2007 | Dupray | |
| 2008/0004043 A1 | 1/2008 | Wilson et al. | |
| 2008/0071686 A1 | 3/2008 | Tayebi et al. | |
| 2008/0113671 A1 | 5/2008 | Ghozati et al. | |
| 2008/0299989 A1 | 12/2008 | King et al. | |
| 2009/0046677 A1 | 2/2009 | Toledano et al. | |
| 2009/0047972 A1 | 2/2009 | Neeraj | |
| 2009/0138198 A1 * | 5/2009 | Lee et al. | 701/213 |
| 2009/0157693 A1 | 6/2009 | Palahnuk | |
| 2010/0242097 A1 | 9/2010 | Hotes et al. | |
| 2010/0251340 A1 | 9/2010 | Martin et al. | |
| 2011/0137817 A1 | 6/2011 | Roumeliotis et al. | |

OTHER PUBLICATIONS

Coombs, jason "Win32 API Obscurity for I/O Blocking and Intrusion Prevention", Jun. 2005.*
SS Shende, AD Malony—International Journal of High Performance Computing, 2006, pp. 1-25.*
Sanner, Python: A Programming Language for Software Integration and Development, The Scripps Research Institute, 1999.*
Office Action dated Oct. 7, 2011 for U.S. Appl. No. 12/406,825.
Press Release, Veriplace Launch, Apr. 1, 2008, Wavemarket, Inc.
Veriplace Developer Guide, Apr. 1, 2008, Wavemarket, Inc.
Office Action dated Jul. 20, 2012 for U.S. Appl. No. 12/791,854.
Office Action dated May 29, 2012 for U.S. Appl. No. 12/728,174.
Office Action dated Sep. 14, 2012 for U.S. Appl. No. 12/728,174.
Advisory Action dated Sep. 7, 2012 for U.S. Appl. No. 12/406,825.
Google Search, Sep. 4, 2012, Mobile API Permission.
Office Action dated Jun. 1, 2012 for U.S. Appl. No. 12/406,825.
Office Action dated May 6, 2013 for U.S. Appl. No. 12/791,854.
Office Action dated Dec. 16, 2013 for U.S. Appl. No. 12/791,854.

* cited by examiner

SYSTEM AND METHOD FOR MANAGING THIRD PARTY APPLICATION PROGRAM ACCESS TO USER INFORMATION VIA A NATIVE APPLICATION PROGRAM INTERFACE (API)

CROSS REFERENCE TO RELATED APPLICATION(S)

This application claims the benefit of U.S. Provisional Application No. 61/164,361, filed Mar. 27, 2009, which is incorporated by reference as if fully set forth.

BACKGROUND

As telecommunication carriers continue to invest in location infrastructure, a proliferation of location-based services is developing ranging from consumer services such as local search and mobile social networking to enterprise services such as fleet management and asset tracking.

Java™ Micro Edition (Java ME™), the predominant execution environment for mobile devices in the market today, supports access to location technologies (including A-GPS) through the JSR 179 standard location application program interface. In most cases, the only option open to a mobile network operator for managing control to the JSR 179 API or other APIs which access potentially sensitive user information is through application signing (whereby the mobile operator attaches a cryptographically secure digital signature to the mobile application before deploying it to the mobile device.) Although digital signing is an important safeguard, it is not sufficient.

Once deployed in the field, the mobile network operator has very little control over the behavior of the mobile application. Access to sensitive APIs such as the JSR-179 API cannot be limited or managed. In many cases mobile applications cannot even be monitored. In a sense, the application is "thrown out into the wild", and certification/validation begins and ends during the digital signing process. In view of the above, it would be desirable to provide a method for managing third party application program access to user information via a particular native application program interface (API).

SUMMARY

The invention provides a method for managing third party application program access to user information via a particular native application program interface (API). The method includes providing a wrapped native API including a wrapper library and inspecting a third party application program for the presence of the wrapper library in an unmodified form. The application program is inspected to identify API calls. An identified API call to a circumventing API is instrumented by wrapping the circumventing API to generate a wrapped non-circumventing API and modifying the third party application program to redirect the identified API call from the circumventing API to the wrapped non-circumventing API. A request for a permission to access user information is received from the third party application program via the wrapper library executed on a user device. An authorization is received to provide the permission to access the user information, and the permission to access the user information is provided to the executed third party application program.

The invention further provides a method for validating an application program implementing a wrapper library configured to access a particular native application program interface (API). The method includes providing a wrapped native API including a wrapper library and inspecting a third party application program for the presence of the wrapper library in an unmodified form. The application program is inspected to identify API calls. An identified API call to a circumventing API is instrumented by wrapping the circumventing API to generate a wrapped non-circumventing API and modifying the third party application program to redirect the identified API call from the circumventing API to the wrapped non-circumventing API.

The invention further provides a system for validating an application program implementing a wrapper library configured to access a particular native application program interface (API). The system includes a computing device including one or more memories including instructions operable to enable the computing device to perform a procedure which includes inspecting a third party application program for the presence of the wrapper library in an unmodified form. The application program is inspected to identify API calls. An identified API call to a circumventing API is instrumented by wrapping the circumventing API to generate a wrapped non-circumventing API and modifying the third party application program to redirect the identified API call from the circumventing API to the wrapped non-circumventing API.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
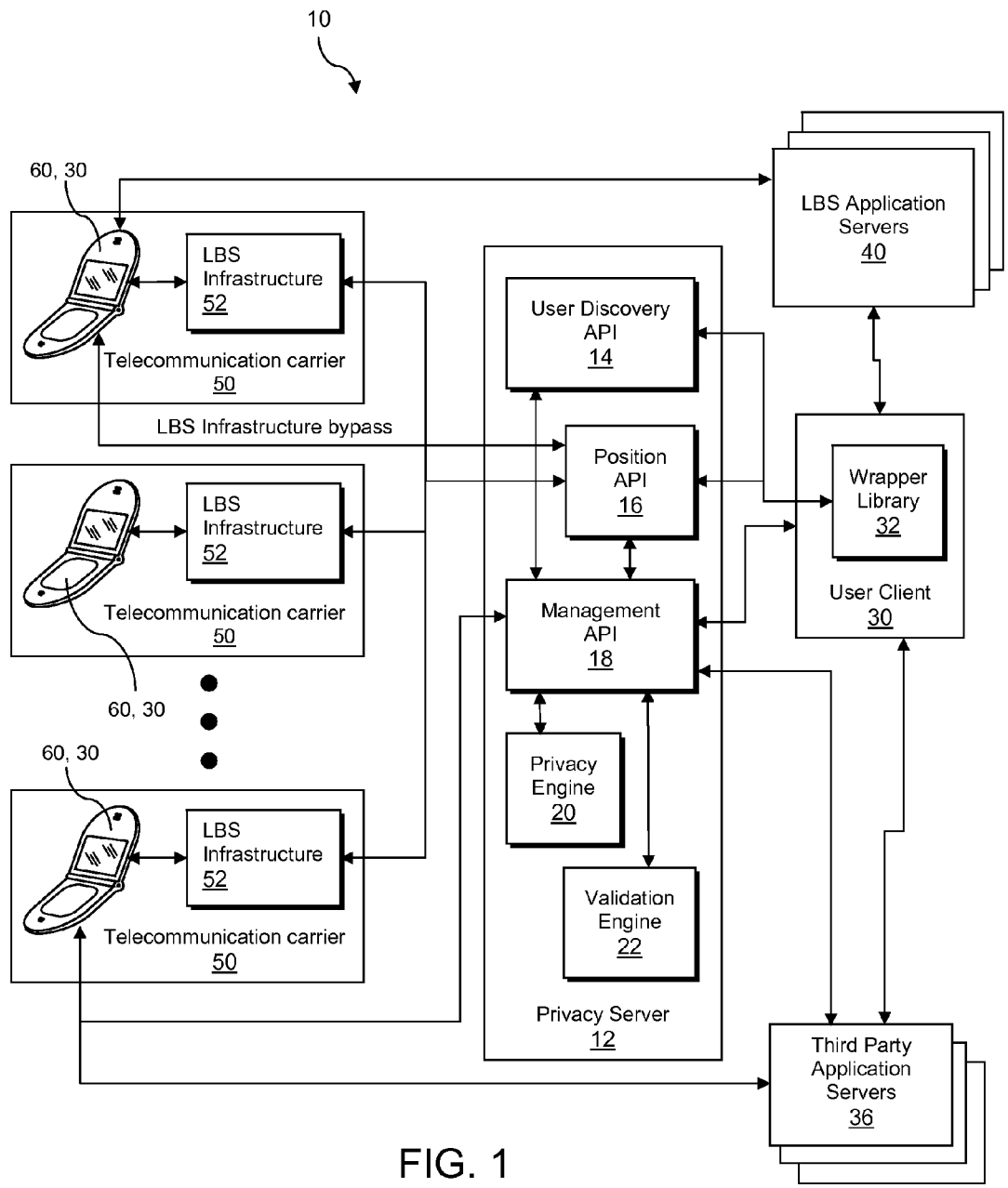
FIG. 1 is a schematic illustration of an exemplary operating environment in which a system for managing third party application program access to user information via a particular native application program interface (API) according to a preferred embodiment of the invention is operable.

The preferred embodiments of the present invention are described below with reference to the drawing figures where like numerals represent like elements throughout.

Referring to FIG. 1, a schematic illustration of an exemplary operating environment 10 is shown in which a preferred system in the form of a privacy server 12 may be used for distributing and validating an application program implementing a wrapper library configured to access a particular native application program interface (API) to securely manage permissions for accessing user location information or other forms of user information considered private by a user. The privacy server 12 includes one or more computing devices and one or more memory devices, which computing devices and memory devices may be integrally constructed or connected in any suitable manner, for example via a network. The privacy server 12 provides a platform which enables a user discovery application program interface (API) 14, a position API 16, a management API 18, a privacy engine 20, and a validation engine 22.

The privacy server 12 via the management API 18 is configured to provide a wrapped native API including a wrapper library to entities desiring to distribute or execute third party application programs configured to obtain and use user information, preferably including location information, for one or more processes. Such entities may include aftermarket software developers, original equipment device manufacturer (OEM) software developers, or any entity desiring to distribute or execute application programs dependent on user information. Third party application servers 36 or any suitable apparatus of such desiring entities can receive the wrapped native API from the privacy server 12 via the management API 18. The wrapped native API via the wrapper library is preferably configured to communicate a request for user location information from a validated third party application program executed by a suitable device such as the user client 30, or alternatively, executed by a suitable server remote to the user client 30.

As set forth herein, third party application programs preferably represent any application program configured to run on a particular operating system or within a particular execution environment. Third party application programs preferably include mobile application programs configured to obtain and process user location information. The wrapped native API employs logic to authorize third party application program requests for user information, preferably including user location information, via a central privacy store stored on the privacy server 12 and regulated by the privacy engine 20. Secure communication over a telecommunication carrier data network is preferably employed to perform the authorization process. A preferred type of native API for wrapping is a native location API such as the JSR 179 API supported by the Java™ Micro Edition (Java ME™) execution environment, and a preferred user information for which authorization is required is user location information.

To be validated, or stated in another manner, certified, third party application programs must be coded against the wrapper library instead of against the native API. The wrapped native API differs from the original native API at least in that the API classes are presented in a different package and the wrapped native API supports an additional API class that allows specifying of the name or other identification of a third party application program coded against the wrapper library to be used in the authorization process. Further, additional error codes are preferably defined in the wrapped native API for representing an authorization failure.

In the case of a wrapped native location API, a location consent user interface (UI) for authorizing access to location information is preferably provided as part of the wrapped native API logic, especially for implementations which require substantially immediate, real-time authorization from a mobile user. Alternatively, a consent user interface for authorizing access to other non-location user information can be provided. Authorization responses to UI interactions are preferably persistently stored in a central privacy store on the privacy server 12 regulated by the privacy engine 20. Supported authorization responses preferably include "yes", "no", "always" and "never". Authorizations can further be dependent on variables such as time and location of user.

The validation engine 22 is configured to inspect via the management API 18 an application program coded against the wrapper library, which application program may reside on and be received from a third party application server 36 or a user client 30, such as a personal computer, mobile telephone device, or global positioning system (GPS) enabled device. The validation engine 22 is further configured to instrument any API calls in the third party application program to circumventing APIs which circumvent the wrapper library. Preferably, after successful inspection and instrumentation by the privacy server 12, a validated and instrumented third party application program is returned to the entity from which it was received for distribution or execution.

Requests for permission to access user information, which is preferably user location information, are preferably received by the privacy server 12 through the position API 16 from validated third party application programs via a wrapper library 32 of the wrapped native API executed by the user client 30. A permission to access user location information is provided to the validated third party application programs by the privacy server 12 in response to receiving an authorization from a user via the management API 18. Alternatively, authorization to access suitable non-location user information can be requested and provided. The permission to access the user information can include the actual location information or other user information required by the third party application program. Alternatively, the permission can be provided without the required user information. In the case, for example, where the third party application is executed on a GPS-enabled user device or other location receiving device and the third party application requires location information received by and stored on the device, only a permission to access the user information would be required, since the actual location information would be stored locally on the device.

Figure 2:
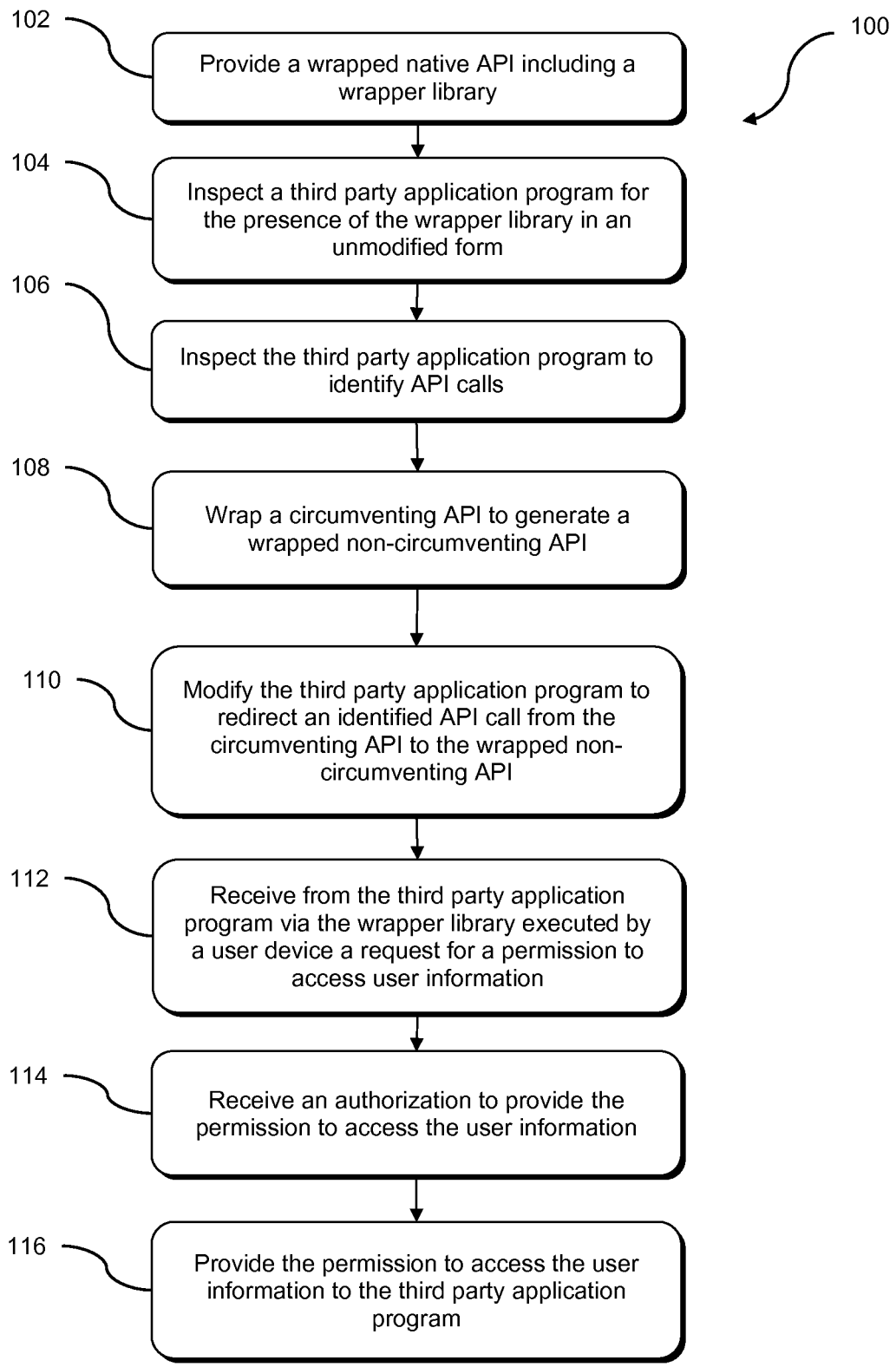
FIG. 2 is a flow chart showing a computer-implemented method of managing third party application program access to user information via a particular native application program interface (API) according to a preferred embodiment of the invention.

Referring to FIG. 2, a process 100 for managing third party application program access to user information via a particular native application program interface (API) is shown. The process 100 is described with reference to components of the privacy server 12 of FIG. 1. The process 100 may alternatively be performed via any suitable system. In the process 100, a wrapped native API comprising a wrapper library is provided (step 102). In a validation procedure represented by steps 104 through 110, the third party application program is inspected for the presence of the wrapper library in an unmodified form (step 104). The third party application program is further inspected to identify one or more API calls (step 106). API calls to one or more circumventing APIs are instrumented by wrapping the one or more circumventing APIs to generate one or more wrapped non-circumventing APIs (step 108) and by modifying the third party application program to redirect the one or more identified API calls from the one or more circumventing APIs to the one or more wrapped non-circumventing APIs (step 110). Steps 112 through 116 set forth an authorization procedure in which a permission to access user information is disseminated to a third party application program which has been validated and instrumented in steps 104 through 110. A request for permission to access user information is received via the wrapper library 32 from the third party application program as executed on a user device (step 112). An authorization to provide the permission to access the user information is received (step 114), and the permission to access the user information is provided to the third party application program in response to receiving the user information request and the authorization to provide the user information (step 116).

The privacy server 12 via the management API 18 is preferably configured to provide the wrapped native API including the wrapper library 32 to an entity desiring to configure a third party application for processing user information, which user information is preferably user location information. The third party application server 36 or other suitable system can receive a wrapped native API provided by the privacy server 12. The third party application server 36 or other suitable system can transmit to the privacy server 12 a third party application program coded against the received wrapper library 32 for validation via the validation engine 22.

In the validation procedure, the validation engine 22 preferably inspects the third party application program for the presence of the wrapper library 32 in an unmodified form. In the case of a Java™ application program, bytecode inspection is preferably performed by inspecting Java™ class files and comparing bytes in the class files of the third party application program with bytes in a known configuration of the wrapper library 32. The validation engine 22 rejects the third party application program, disallowing it access to the native API, if modification to the wrapper library 32 is detected. Inspection is important to prevent modifications to the wrapper library 32 which may permit the third party application program to access user information such as user location information without authorization.

During inspection, the validation engine 22 further preferably compares API calls with a list of permitted API calls or a list of non-permitted API calls, or stated alternatively, banned API calls. The validation engine 22 rejects the third party application program, disallowing it access to the native API, if the identified API calls correspond to one or more of the non-permitted API calls or if one or more of the identified API calls do not correspond to one of the permitted API calls. Alternatively, rather than rejecting the third party application program, non-permitted API calls which are non-permitted by virtue of being directed toward a circumventing API can be instrumented as described above such that a non-permitted API call is redirected to a wrapped non-circumventing API rendering it permitted. For platforms which use bytecode, inspecting for non-permitted API calls is preferably performed by bytecode inspection. In the case of a Java™ application program, inspection is preferably performed by iterating through the bytecode class files in the third party application program and searching the constant pool of each class for class or method references. This is particularly effective in that the Java™ ME execution environment, which typically does not support reflection or dynamic class loading, requires direct references to classes that are used by a class in its constant pool.

Instrumented API calls preferably correspond to sensitive APIs which provide access to sensitive user information such as user location information, user financial information and user medical information. Sensitive APIs can further correspond to credential managing APIs, such as a Java™ Record Management System (RMS) API, for managing secure user credentials. To avoid direct reading or writing of persistent memory on a device such as the user client 30 used to store authorizations or other secure user credentials by a third party application program, secure wrapping of credential managing APIs such as the Java™ RMS API through an instrumentation process is performed.

Direct calls to the native API are preferably non-permitted, and the validation engine 22 preferably inspects the application program to identify any direct call to the native API and rejects the third party application program, disallowing it access to the native API, if at least one of the identified API calls corresponds to a direct call to the native API. Alternatively, rather than rejecting the third party application program, direct calls to the native API can be instrumented such that a direct API call to the native API is redirected to the wrapped native API. In the case of a native location API such as the JSR 179 API, a direct call to the native location API would be detrimental in that it may permit access to user location information without a requisite authorization from the privacy server 12.

After completion of the validation procedure as described above, if the third party application program has not been rejected, the wrapper library 32 is preferably re-instrumented as a secure, obfuscated version in combination with the instrumented third party application. The third party application program is then preferably transmitted to a user information provider for signature. In the case of a third party mobile application program for processing user location information, the user information provider is preferably a telecommunication carrier represented by the telecommunication carrier server 50 which provides a digital signature for the third party mobile application. Alternatively, the application program can be digitally signed via the privacy engine 20 of the privacy server 12 without input from the user information provider. The signed and validated third party application program is then preferably submitted to the entity desiring to distribute the third party application program, represented in FIG. 1 by the third party application server 36, for distribution to end users represented by user client 30.

The management API 18 is preferably configured to establish a user account using identifying information of a user. The privacy server 12 is configured to receive the identifying information through the management API 18 from the user client 30, via a network connection, which network connection is preferably an Internet network connection. The identifying information preferably includes at least the name of the user, a telephone number associated with a user's mobile device, and a telecommunication carrier identifier associated with the user's mobile device used to establish a connection with the telecommunication carrier. The management API 18 preferably provides an interface through a client application running on the user client 30, which client application is preferably a web client, WAP client, Java ME™ client, BREW™ client, SMS client or other suitable client. Alternatively, the privacy server 12 may be configured to receive the identifying information from the user client 30 through an interface provided by the user discovery API 14. The privacy server 12 associates a user identifier, which is preferably randomly generated, with the user account via a privacy engine 20. The privacy server 12 is configured to receive from an executed third party application program via the wrapper library 32 through the user discovery API 14 a request for the user identifier of the user.

The third party application server 36 is connected to the user clients 30 via a network and receives from the user clients 30 requests for a third party application program which has been validated via the privacy server 12. The third party application server 36 preferably transmits a validated and signed third party application program to the user client 30, and the third party application program is executed by the user client 30. To ensure correct identification of the user client 30, cryptographically secure provisioning of validated third party application programs is preferably executed through a client-side authentication by the privacy server 12. The provisioning process preferably occurs at least during a first launch of the third party application program on a user client 30. In a preferred embodiment, location-based services are preferably provided via validated third party application programs on the basis of the positioning of the user client 30, which as shown is preferably integrated with a mobile device 60, for example a telecommunications-enabled personal computer or mobile telephone. Alternatively, any suitable services requiring secure aggregation and dissemination of user information can be provided via the validated third party application programs.

A location based services (LBS) application server 40 can be configured for communication or cooperation with a third party application program implementing the wrapper library 32 to provide location based services with authorizations obtained via the privacy server 12. The LBS application server 40 can execute one or more applications which cooperate with the third party application program executed by a user device such as the user client 30. In the absence of a LBS application server 40, the user client 30 may execute a standalone third party application program. Location-based services provided by the third party application program alone or in conjunction with the LBS application server 40 can include one or more of traffic advising, network planning, navigation assistance, assistance in location of points of interest, and location-based advertising. The location-based services may further include providing location information regarding a user of a mobile device 60 to another user or users of one or more other mobile devices 60 based on location preferences provided by the located user. Location-based services which support sharing of location information among different users may be delivered through applications compatible with or integral with web-based social networking applications such as Facebook™, Yelp™, MySpace™, and Friendster™, or alternatively, through stand alone web-based or non-web-based applications.

The privacy server 12 is configured to receive via the user discovery API 14 an identifier request authorization, which, depending on the third party application program and the preference of the user, is received from either user input through the user client 30 or automatically from the third party application program. In the case where authorization is provided automatically via the third party application program, the identifier request authorization is preferably provided in the form of an element of known personal information from the user including but not limited to one or more of an email address, a physical address, and a telephone number associated with the user client 30. The privacy server 12 is configured to provide via the user discovery API 14 the user identifier to the third party application program via the wrapper library 32 in response to receiving the identifier request authorization.

The privacy server 12 is preferably configured to receive from a location based services (LBS) infrastructure 52 of a telecommunication carrier server 50 via the position API 16 mobile device location information of a mobile device 60 connected to the LBS infrastructure 52 and associated with the user identifier, which mobile device 60 preferably includes a user client 30. The privacy server 12 via the management API 18 preferably accommodates the LBS infrastructures 52 of a plurality of different telecommunication carrier servers 50 which may implement or permit compatibility with various device locating technologies including but not limited to GPS, A-GPS, cell tower triangulation, and manual user entry of location parameters. Accordingly, the third party application program via the wrapper library 32 need only interface with the privacy server 12 through the user discovery API 14 and the position API 16, without addressing the interface requirements of a particular telecommunication carrier.

The privacy server 12 is preferably further configured to receive mobile device location information of the mobile device 60 directly from the mobile device 60, by passing the LBS infrastructure 52 of a telecommunication carrier, preferably through an internet connection. In such case, mobile device location information may be provided based on a detected IP address through which the mobile device 60 communicates, or alternatively through GPS, cell tower triangulation or other suitable locating method. In one example, a mobile device 60 configured to connect with Wi-Fi internet hot spots may connect with the privacy server 12, allowing the privacy server 12 to determine the approximate location of the mobile device 60 through a detected IP address of a Wi-Fi internet hot spot to which the mobile device is connected. In another example, a mobile device 60 may provide location information, generated locally by the mobile device 60 through signals received from GPS satellites or cell towers, to the privacy server 12 via a local client, for example a web, WAP, Java ME™, BREW™, SMS client on the mobile device 60.

The privacy server 12 preferably actively queries at predetermined intervals the mobile device 60 or the LBS infrastructure 52 of a telecommunication carrier associated with the mobile device 60 for the mobile device location information. The frequency at which queries are made by the privacy server 12 are preferably based on mutually acceptable preferences of the mobile device user, telecommunication carrier, third party application program and LBS application server administrator. The privacy server 12 preferably stores the location information for a suitable period of time. Alternatively, the privacy server 12 can be configured without the requirement to receive, aggregate or disseminate location information. In the case, for example, where the third party application is executed on a GPS-enabled user device or other location-receiving device, and the third party application requires location information received by and stored on the device, only a permission to access the user information would be required from the privacy server 12, since the actual location information would be stored locally on the device.

The privacy server 12 is preferably configured to receive from the third party application program via the wrapper library 32 through the position API 16 a request for a permission to access the mobile device location information of the user mobile device 60 associated with the pre-determined user identifier. Prior to providing the permission to access the user's mobile device location, a location request authorization must be received by the privacy server 12 via the management API 18 from the user through the user client 30, which as indicated above is preferably provided integral with the mobile device 60. The privacy server 12 is configured to provide the permission to access the mobile device location information to the validated third party application program via the wrapper library 32 in response to receiving the location request authorization from the user, and if a location request authorization is not provided, no permission to access the mobile device location information of the user is provided. The location request authorization can be received from the user through the user client 30 as an authorization to provide permission to access the mobile device information one time, a predetermined number of times, for a specified time interval, until the authorization is revoked via the user client 30, or until any predetermined condition is met. The location request authorization is preferably received via the location consent user interface (UI) provided as a component of the wrapped native API logic. Preferably, the permission to access the mobile device location information includes a permission to access mobile device location information stored on the mobile device. The permission to access the mobile device location information can alternatively include the actual location information received by the privacy server 12 and required by the third party application program, for example in cases in which the mobile device does not store location information.

The privacy server 12 is configured to receive through the management API 18 an indication from the user of during which times the mobile device 60 can be located. Implementing the privacy engine 20, the privacy server 12 generates a database having a rules set based on the indication of the user. After receipt of the location request authorization from the user client 30, the privacy server 12 provides a permission to access the user mobile device location to the third party application program via the wrapper library 32 operable during the times indicated by the user as set forth in the rules set maintained by the privacy engine 20, and inoperable at all other times. Preferably, the privacy server 12 is configured to receive an indication from the user of with what frequency the user mobile device 60 can be located, for example once every minute, once every half hour, or once every hour. Further, the privacy server 12 preferably can receive an indication from the user of a number of times or duration of time the mobile device location information may be accessed by the third party application program after receiving the location request authorization and prior to receiving an additional location request authorization. Alternatively, the privacy server 12 can receive an indication from the user that access to the mobile device location information may be provided to the third party application program until such time as the user revokes authorization for the third party application program to receive location information.

The privacy server 12 can further receive an indication from the user of a level of geographic precision the user mobile device 60 can be located, and the privacy server 12 can provide a permission to the third party application program via the wrapper library 32 to access a position of the user mobile device 60 t with a precision selected by the user. Preferably, the privacy server 12 can provide the permission to access the user mobile device location, depending on the preference of the user, as a predetermined geographic area in which the user is located, without providing the exact position of the user. In a preferred embodiment, the privacy server 12 can provide the permission to the third party application to access the user mobile device location as a city block where the user mobile device 60 is located, as a neighborhood where the user mobile device 60 is located, as a city where the user mobile device 60 is located, or as a state where the user mobile device 60 is located. Alternatively, the privacy server 12 can provide the permission to access the user mobile device location with the actual precision at which it is received or generated, for example a point location including an approximated latitude and longitude. In such manner, a user can protect his or her privacy by only authorizing the privacy server 12 to provide an access permission at a level of location precision that he or she is comfortable with. Indications regarding desired geographic precision are also maintained as a rules set database by the privacy engine 20.

Indications are preferably further received by the privacy server 12 through the position API 16 from the associated telecommunication carrier server 50 of at which times, with what frequency and under what conditions the user mobile device 60 can be located and with what geographic precision. In such manner, a telecommunication carrier can communicate its privacy requirements to the privacy server 12. Indications from the telecommunication carrier server 50 are also preferably maintained as a rules set database by the privacy engine 20.

The privacy server 12 is further configured to receive through the position API 16 indications from the third party application program via the wrapper library 32 of at which times, with what frequency, and under what conditions the third party application program requires the mobile device location information. The privacy server 12 provides to the third party application program a permission to access the user mobile device location at the times indicated, at the frequency indicated, and under the conditions specified by the third party application program when or to the extent that such times, frequency, or conditions are not conflicting with indications received from the user or the associated telecommunication carrier server 50. The privacy server 12 is further configured to receive an indication from the third party application program of a level of geographic precision required of the mobile device location information. The privacy server 12 provides the permission to access the user mobile device location to the third party application program at the geographic precision indicated by the third party application program when or to the extent that such geographic precision does not conflict with indications received from the user or the associated telecommunication carrier server 50. Accordingly, the privacy server 12 is configured to provide the permission to access the user mobile device location to the third party application program based on one or more indications from the third party application program, one or more indications of the user, and one or more indications of the telecommunication carrier server 50. Preferably, the privacy server 12 provides the permission to access the user mobile device location to the third party application program in conformance with the one or more indications of the telecommunication carrier server 50, and in conformance with the one or more indications of the user to the extent that the one or more indications of the user are not in conflict with the one or more indications of the telecommunication carrier server 50, and in conformance with the one or more indications from the third party application program to the extent that the one or more indications from the third party application program do not conflict with the one or more indications of the telecommunication carrier server 50 and the one or more indications of the user. As such, indications of the telecommunication carrier server 50 preferably take precedence over indications of the user, and indications of the telecommunication carrier server 50 and the user preferably take precedence over indications of the third party application program. As one example, if the third party application program is running an application which requires for proper functionality a precise point location including an approximated latitude and longitude of a mobile device as the level of geographic precision, and the telecommunication carrier server 50 or the user permits locating the user only by the city in which the user is located, then the application cannot function and the third party application program can notify the user client 30 accordingly. As another example, if the third party application program is running an application which requires for proper functionality to receive location information generally continuously without reauthorizations after an initial user authorization, and the telecommunication carrier server 50 requires reauthorization by a user each time location information is requested by a third party application program regardless of user preference, then the application cannot function and the third party application program can notify the user client 30 accordingly.

The privacy server 12 is configured to receive from the user client 30 identifying information of the third party application program and to transmit the identifying information of the third party application program to the telecommunication carrier server 50. The privacy server 12 is further configured to transmit to the telecommunication carrier server 50 indications received from the third party application program of at which times, with what frequency, and under what conditions the third party application program requires the mobile device location information. Based on the identifying information and/or the indications received from a particular third party application program, the telecommunication carrier server 50 can transmit to the privacy server 12 indications of at which times, with what frequency, under what conditions, and with what geographic precision a user mobile device 60 can be located by the particular third party application program. In such a manner, a telecommunication carrier 50 can for different third party application programs provide different indications of at which times, with what frequency, under what conditions, and with what geographic precision a user mobile device 60 can be located. For example, a third party application program considered to be trusted may be permitted via the telecommunication carrier server 50 to receive location information of the mobile device 60 at a higher precision than a third party application program considered to be non-trusted based on the identifying information of the third party application program.

The privacy server 12 preferably transmits to the third party application program indications received from the telecommunication carrier server 50 of at which times, with what frequency, under what conditions, and with what geographic precision a user mobile device 60 can be located by a third party application program via the wrapper library 32. A third party application program is therefore able to provide an indication to the user via the user client 30 whether it is compatible with the indications of the telecommunication carrier server 50 associated with the user's mobile device 60, for example whether the indications of the telecommunication carrier server 50 are too restrictive to permit an application to function properly. Alternatively, the privacy server 12 can communicate to a user directly via the user client 30 whether a third party application program is compatible with the indications of the telecommunication carrier server 50 associated with the user's mobile device 60.

The privacy server 12 is further configured to receive from the third party application program via the position API 16 a request for an authorization to provide the mobile device location information to a peer. The peer is preferably another user who uses the mobile device location information of the mobile device 60 for interaction with an application running on the LBS application server 40 or the other user's device. Such application may include for example a game which requires users to exchange location information in the process of playing the game. A permission authorization is received by the privacy server 12 via the position API 16 from the user through the user client 30 to provide the mobile device location information to the peer. In response to the received permission, the privacy server 12 provides to the third party application program via the wrapper library 32 the permission to access the mobile device location information and to provide the mobile device location information to the peer.

Figure 3:
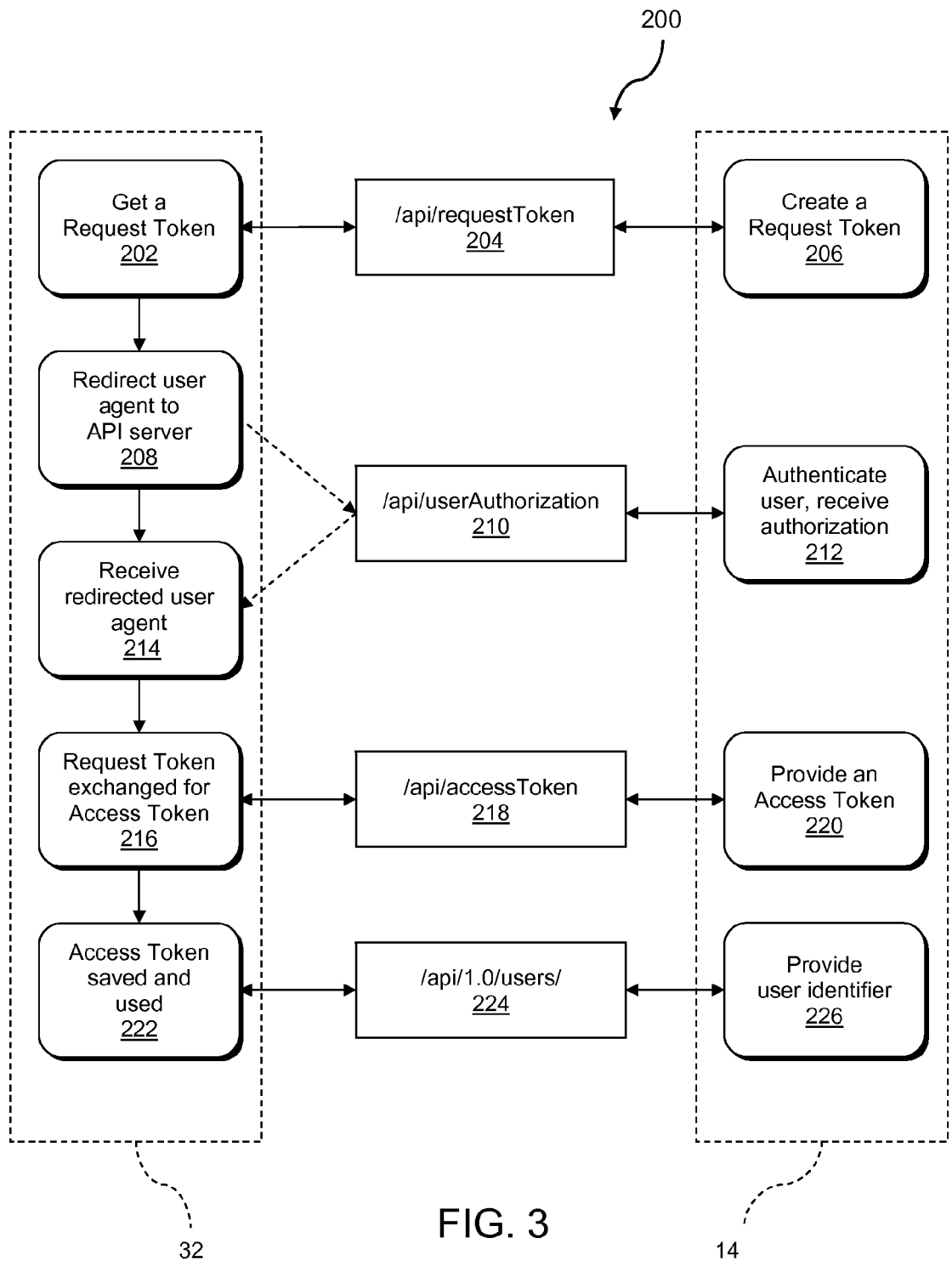
FIG. 3 is a workflow diagram showing interactions of an authorization procedure between a user discovery application program interface (API) according to a preferred embodiment of the invention and an executed third party application program.

Referring to FIG. 3, a workflow 200 of an authorization procedure supported by the privacy server 12 and implemented by the user discovery API 14 according to the preferred embodiment of the present invention is shown. The third party application program via the wrapper library 32 directs a request for a request token (step 202) through a request token URL 204 provided by the user discovery API 14. The privacy server 12, via the user discovery API 14 creates a request token (step 206) which is provided to the wrapper library 32 in response to the third party application program's request. Saving and configuring access of the third party application program to the request token is preferably performed via a credential managing API, for example a Java™ RMS API in communication with the wrapper library 32. If required by a user or a user's telecommunication carrier, or if necessitated by a particular application, a user agent is redirected by the third party application program to the privacy server 12 (step 208) through a user authorization URL 210 provided by the user discovery API 14 which implements a suitable web interface or other interface to permit the user to enter a required authorization. The privacy server 12, via the user discovery API 14 authenticates the user, shows the user the user's privacy settings, receives the identifier request authorization from the user, and redirects the user agent back to the third party application program (step 212). The third party application program receives the redirected user agent (step 214) and provides the request token via the wrapper library 32, as associated with the identifier request authorization from the user, to the privacy server 12 through an access token URL 218 provided by the user discovery API 14 (step 216). The privacy server 12 provides an access token to the wrapper library 32 in exchange for receiving the authorized request token (step 220). The wrapper library 32 saves the access token and presents the access token to the privacy server 12 (step 222) through an identity URL 224, and the privacy server 12 provides the user identifier to the third party application program in response to receiving the access token (step 226). Saving and configuring access of the third party application program to the access token is preferably performed via a credential managing API, for example a Java™ RMS API. The access token is preferably revoked immediately or within a predetermined time period after the user identifier is provided to the third party application program. The wrapper library 32 is preferably configured to securely store the request and access tokens such that they are not directly accessible by the third party application.

In the case where user authorization is not required as a prerequisite for providing the user identifier to the third party application program, for example in instances where a user has already provided identifying information to the third party application program, steps 202, 206, 208, 212, 214, 216 and 220 are omitted. In such case, the third party application program via the wrapper library 32 preferably provides an application-specific access token in the step 222 which includes identifying information previously provided to the third party application program by the user in order to retrieve the user's user identifier.

Figure 4:
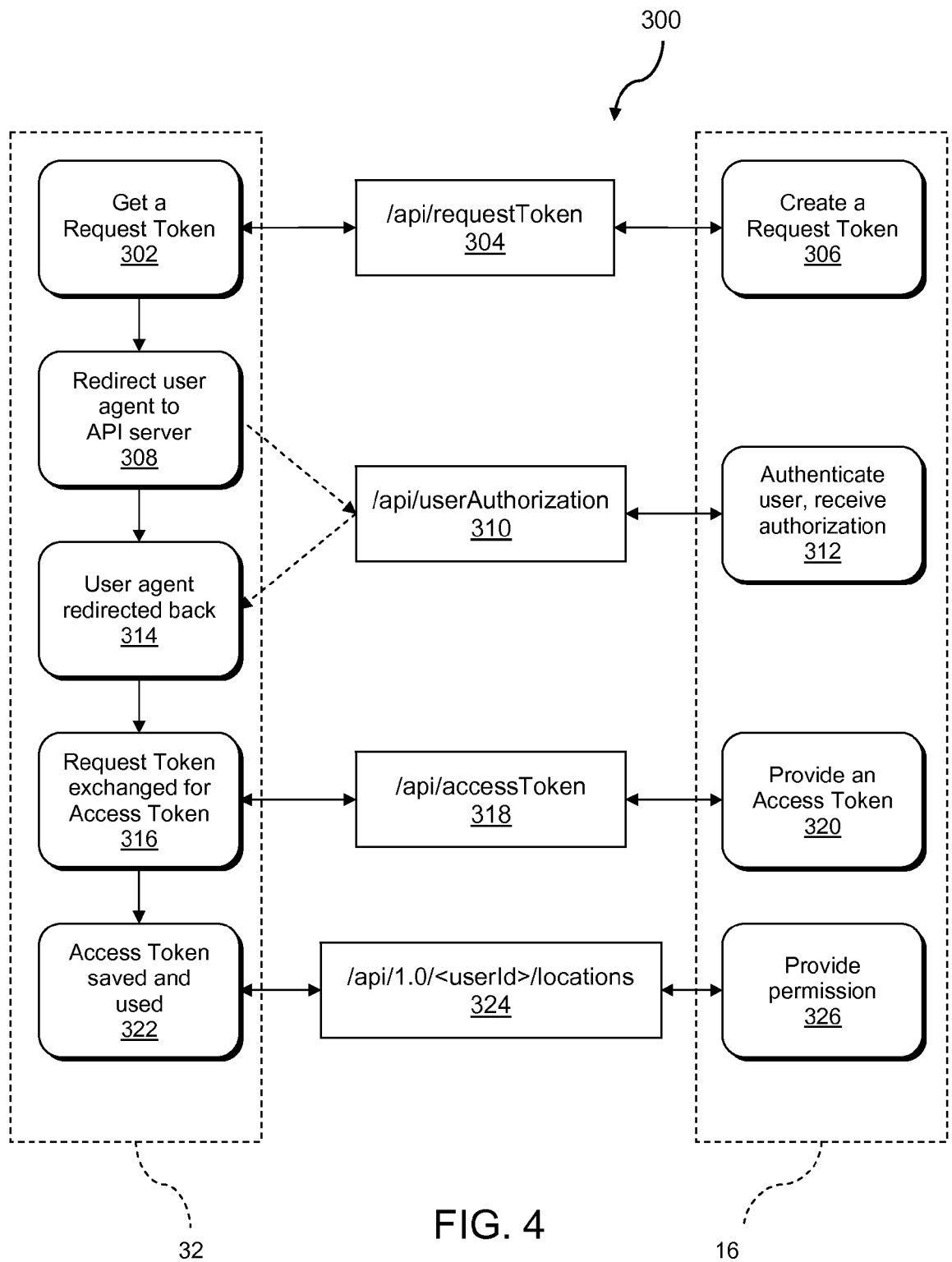
FIG. 4 is a workflow diagram showing interactions of an authorization procedure between a location application program interface (API) according to a preferred embodiment of the invention and an executed third party application program.

Referring to FIG. 4, a workflow 300 of an authorization procedure, which preferably follows in time the workflow 200 of FIG. 3, supported by the privacy server 12 and implemented by the position API 16 according to the preferred embodiment of the present invention is shown. The third party application program via the wrapper library 32 directs a request for a request token (step 302), including the user identifier, through a request token URL 304 provided by the position API 16. The privacy server 12, via the position API 16 creates a request token (step 306) which is provided to the wrapper library 32 in response to the third party application program's request. Saving and configuring access of the wrapper library 32 to the request token is preferably performed via a credential managing API, for example a RMS API. The user agent is redirected by the third party application program to the privacy server 12 (step 308) through a user authorization URL 310 provided by the position API 16 which implements a suitable web interface or other consent user interface (UI) to permit the user to enter required authorization. The privacy server 12, via the position API 16 authenticates the user, shows the user the user's privacy settings, receives the location request authorization from the user, and redirects the user agent back to the third party application program (step 312). The third party application program receives the redirected user agent (step 314) and provides via the wrapper library 32 the request token, as associated with the location request authorization from the user, to the privacy server 12 through an access token URL 318 provided by the position API 16 (step 316). The privacy server 12 provides an access token to the wrapper library 32 in exchange for receiving the authorized request token (step 320). The third party application program saves the access token via the wrapper library 32 and presents the access token via the wrapper library 32 to the privacy server 12 (step 322) through a location URL 324, and the privacy server 12 provides the permission to access the user mobile device location, which may include new or updated location information, to the third party application program in response to receiving the access token (step 326). Saving and configuring access of the wrapper library 32 to the access token is preferably performed via a credential managing API, for example a wrapped RMS API. The access token is preferably revoked immediately or within a predetermined time period after the permission to access the user mobile device location is provided to the third party application program. The wrapper library 32 is preferably configured to securely store the request and access tokens such that they are not directly accessible by the third party application.

In communicating with the privacy server 12, the wrapper library 32 is preferably configured to use the access token to check for existing permissions, and the privacy server is preferably configured to notify the wrapper library 32 of the existing permissions, from prior user authorizations stored by the privacy server 12. If there are no existing permissions, the wrapper library 32 preferably prompts a user for authorization. If existing permissions exist, the wrapper library 32 preferably updates the permission status including the permission access history stored on the privacy server 12. The wrapper library 32 is preferably configured to use the access token to manage permissions on the privacy server 12 for a particular combination of user and third party application. The wrapper library 32 can be additionally configured to use the access token in a process of submitting user mobile device location information generated and stored on the user mobile device to the privacy server. The workflow 300 can alternatively be applied toward providing any suitable user information including non-location information.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A method for managing third party application program access to user information via a particular native application program interface (API) comprising:
   providing a wrapped native API comprising a wrapper library;
   inspecting a third party application program for the presence of the wrapper library in an unmodified form;
   searching the third party application program to identify at least one API call to at least one circumventing API which circumvents the wrapper library of the native API; and
   instrumenting the at least one identified API call to the at least one circumventing API, wherein the instrumenting comprises:
   wrapping the at least one circumventing API to generate at least one wrapped non-circumventing API; and
   modifying the third party application program to redirect the at least one identified API call from the at least one circumventing API to the at least one wrapped non-circumventing API;
   receiving from the third party application program via the wrapper library executed on a user device a request for a permission to access user information;
   receiving an authorization to provide the permission to access the user information; and
   providing the permission to access the user information to the third party application program.

2. The method of claim 1, further comprising:
   comparing API calls of the third party application program with at least one of a list of permitted API calls and a list of non-permitted API calls to identify the at least one API call to the at least one circumventing API; and
   instrumenting the at least one identified API call in response to the at least one identified API call corresponding to a non-permitted API call.

3. The method of claim 2, further comprising contacting a system via a network for inspecting the third party application program.

4. The method of claim 1, further comprising inspecting the application program to identify a direct call to the native API.

5. The method of claim 1, further comprising:
   comparing API calls of the third party application program with a list of sensitive API calls to sensitive APIs to identify the at least one API call to the at least one circumventing API; and
   instrumenting the at least one identified API call in response to the at least one identified API call corresponding to at least one of the sensitive API calls to sensitive APIs.

6. The method of claim 1, wherein wrapping the native API comprises wrapping a native location API to generate a wrapped native location API.

7. The method of claim 1, wherein wrapping the native API comprises wrapping a JSR 179 standard location API to generate a wrapped JSR 179 standard location API.

8. The method of claim 1, wherein wrapping the at least one circumventing API comprises wrapping a credential managing API configured for storing credentials to generate a wrapped credential managing API.

9. The method of claim 8, wherein wrapping the credential managing API comprises wrapping an RMS API.

10. The method of claim 1, further comprising inspecting the third party application program through bytecode inspection.

11. The method of claim 1, wherein the inspecting the third party application program for the presence of the wrapper library comprises:
    inspecting class files of the third party application program; and
    comparing bytes in the class files of the third party application program with bytes in a known configuration of the wrapper library.

12. The method of claim 1, further comprising:
    establishing a user account for a user associated with the user device;
    associating a user identifier with the user account;
    receiving from the third party application program via the wrapper library executed by the user device a request for the user identifier;

receiving from at least one of the user and the application program via the wrapper library an identifier request authorization to provide the user identifier to the application program;

providing the user identifier to the application program in response to receiving the identifier request authorization;

receiving from the application program a request for a permission to access the mobile device location information of the user device;

receiving a location request authorization from the user to provide the permission to access the mobile device location information to the application program; and providing the permission to access the user mobile device location to the application program in response to receiving the location request authorization.

13. The method of claim 12, further comprising:
wrapping the at least one circumventing API comprising a credential managing API to generate a wrapped credential managing API; and
configuring access of the third party application program to at least one of the identifier request authorization and the location request authorization via the wrapped credential managing API.

14. The computer-implemented method of claim 12, further comprising:
providing a request token to the wrapper library;
associating the user identifier request authorization with the request token to authorize the request token;
receiving the authorized request token from the wrapper library;
providing an access token to the wrapper library in response to receiving the request token;
receiving the access token from the wrapper library; and
providing the user identifier to the wrapper library in response to receiving the access token.

15. The computer-implemented method of claim 12, further comprising:
providing a request token to the wrapper library in response to receiving the user identifier;
associating the location request authorization with the request token to authorize the request token;
receiving the authorized request token from the wrapper library;
providing an access token to the wrapper library in response to receiving the request token;
receiving the access token from the wrapper library; and
providing the permission to access the user mobile device location to the application program in response to receiving the access token.

16. The method of claim 1, further comprising:
establishing a user account for a user associated with the user device;
associating a user identifier with the user account;
receiving from the third party application program via the wrapper library executed by the user device a request for the user identifier;
receiving from at least one of the user and the application program via the wrapper library an identifier request authorization to provide the user identifier to the application program;
providing the user identifier to the application program in response to receiving the identifier request authorization;

receiving mobile device location information of the user device from at least one of the user device and a remote telecommunication carrier server in communication with the user device;

receiving from the application program a request for the mobile device location information of the user device;

receiving a location request authorization from the user to provide the mobile device location information to the application program; and providing the user mobile device location to the application program in response to receiving the location request authorization.

17. The method of claim 1, further comprising reinstrumenting the wrapped native API as a substantially obfuscated version, wherein the receiving the request for user information comprises receiving the request for user information via the wrapper library of the reinstrumented native API.

18. The method of claim 1, further comprising:
reinstrumenting the wrapper library as a substantially obfuscated version in combination with the instrumented third party application; and
signing the instrumented third party application including the obfuscated wrapper library.

19. The method of claim 1, further comprising:
providing the wrapped native API comprising the wrapper library to a party;
receiving the third party application program from the party;
after the steps of inspecting the third party application program and instrumenting the at least one identified API call,
reinstrumenting the wrapper library as a substantially obfuscated version in combination with the instrumented third party application, and signing the instrumented third party application including the obfuscated wrapper library; and
receiving the request for user information from the signed instrumented third party application via the obfuscated wrapper library.

20. A method for validating an application program implementing a wrapper library configured to access a particular native application program interface (API), the method comprising:
inspecting the application program for the presence of the wrapper library in an unmodified form;
searching the application program to identify at least one application program interface (API) call to at least one circumventing API which circumvents the wrapper library of the native API; and
instrumenting the at least one identified API call to the at least one circumventing API, wherein the instrumenting comprises:
wrapping the at least one circumventing API to generate at least one wrapped non-circumventing API; and
modifying the application program to redirect the at least one identified API call from the at least one circumventing API to the at least one wrapped non-circumventing API.

21. The method of claim 20, further comprising:
comparing API calls of the application program with at least one of a list of permitted API calls and a list of non-permitted API calls to identify the at least one API call to the at least one circumventing API; and
disallowing the third party application program access to the native API based on at least one of:
the at least one identified API call corresponding to at least one of the non-permitted API calls; and the at least one identified API call not corresponding to at least one of the permitted API calls.

22. The method of claim 20, further comprising:
inspecting the application program to identify a direct call to the native API; and
disallowing the third party application program access to the native API based on the at least one identified API call corresponding to a direct call to the native API.

23. The method of claim 20, further comprising disallowing the third party application program access to the native API based on identification of modification in the third party application program to the wrapper library.

24. The method of claim 20, further comprising after the steps of inspecting the third party application program and instrumenting the at least one of the identified API calls:
reinstrumenting the wrapper library as a substantially obfuscated version in combination with the instrumented application; and
signing the instrumented application including the obfuscated wrapper library.

25. A system for validating an application program implementing a wrapper library configured to access a particular native application program interface (API), the system comprising at least one computing device including at least one memory comprising instructions operable to enable the computing device to perform a procedure comprising:
inspecting the application program for the presence of the wrapper library in an unmodified form;
searching the application program to identify at least one application program interface (API) call to at least one circumventing API which circumvents the wrapper library of the native API; and
instrumenting the at least one identified API call to the at least one circumventing API, wherein the instrumenting comprises:
wrapping the at least one circumventing API to generate at least one wrapped non-circumventing API; and
modifying the application program to redirect the at least one identified API call from the at least one circumventing API to the at least one wrapped non-circumventing API.

* * * * *

UNITED STATES PATENT AND TRADEMARK OFFICE
CERTIFICATE OF CORRECTION

PATENT NO. : 8,683,554 B2
APPLICATION NO. : 12/689769
DATED : March 25, 2014
INVENTOR(S) : Martin et al.

It is certified that error appears in the above-identified patent and that said Letters Patent is hereby corrected as shown below:

IN THE SPECIFICATION

At column 7, line 66, delete "by passing" and insert therefore --bypassing--.

Signed and Sealed this
Fourteenth Day of June, 2016

Michelle K. Lee
*Director of the United States Patent and Trademark Office*